United States Patent
Ing

(10) Patent No.: US 11,267,363 B2
(45) Date of Patent: Mar. 8, 2022

(54) METHOD AND SYSTEM FOR PREVENTING MOISTURE ACCUMULATION IN BATTERY PACKS

(71) Applicant: NIO USA, Inc., San Jose, CA (US)

(72) Inventor: Adam H. Ing, San Francisco, CA (US)

(73) Assignee: NIO USA, Inc., San Jose, CA (US)

( * ) Notice: Subject to any disclaimer, the term of this patent is extended or adjusted under 35 U.S.C. 154(b) by 94 days.

(21) Appl. No.: 16/878,085

(22) Filed: May 19, 2020

(65) Prior Publication Data
US 2021/0367221 A1   Nov. 25, 2021

(51) Int. Cl.
| | |
|---|---|
| H02J 7/00 | (2006.01) |
| B60L 53/80 | (2019.01) |
| B60L 53/65 | (2019.01) |
| B60L 53/30 | (2019.01) |
| B60L 50/60 | (2019.01) |
| B60L 53/66 | (2019.01) |
| B60L 58/18 | (2019.01) |
| H01M 10/44 | (2006.01) |

(Continued)

(52) U.S. Cl.
CPC .............. *B60L 53/80* (2019.02); *B60L 50/60* (2019.02); *B60L 53/305* (2019.02); *B60L 53/65* (2019.02); *B60L 53/66* (2019.02); *B60L 58/18* (2019.02); *H01M 10/441* (2013.01); *H02J 7/0013* (2013.01); *H02J 7/00032* (2020.01); *B60K 6/28* (2013.01); *B60L 58/12* (2019.02); *B60Y 2200/91* (2013.01); *B60Y 2200/92* (2013.01); *B60Y 2300/91* (2013.01); *H01M 50/24* (2021.01); *H01M 2220/20* (2013.01)

(58) Field of Classification Search
CPC ........ B60L 53/80; B60L 53/305; B60L 50/60; B60L 53/66; B60L 53/65; B60L 5/18; B60L 58/12; H01M 10/441; H01M 50/24; H01M 2220/20; H02J 7/00032; H02J 7/0013; B60Y 2200/91; B60Y 2200/92; B60Y 2300/91; B60K 6/28
USPC ............................................ 320/109; 701/22
See application file for complete search history.

(56) References Cited

U.S. PATENT DOCUMENTS

| | | | |
|---|---|---|---|
| 5,585,205 A | 12/1996 | Kohchi | |
| 8,247,097 B1 * | 8/2012 | Duff | H01M 50/317 429/50 |

(Continued)

FOREIGN PATENT DOCUMENTS

WO   WO-2012082116 A1 *   6/2012   ............ H01M 50/60

*Primary Examiner* — Zixuan Zhou
(74) *Attorney, Agent, or Firm* — Sheridan Ross P.C.

(57) ABSTRACT

Methods and systems are described that maintain and service electric vehicle battery packs and assemblies. The methods and systems automatically remove a used battery pack from an electric vehicle, replace the used battery pack with a charged battery pack, and service the removed used battery pack for subsequent vehicle installation. The servicing of the used battery pack includes removing a desiccant cartridge from the used battery pack and renewing a desiccant material associated with the desiccant cartridge. This desiccant material may be renewed by drying the desiccant cartridge using a heater. The used battery pack may be conveyed to a battery charger to charge the used battery pack to a predetermined charge level. The renewed, dry, desiccant cartridge may be attached to any battery pack and installed in an electric vehicle after the battery pack has been charged.

20 Claims, 7 Drawing Sheets

(51) Int. Cl.
*B60L 58/12* (2019.01)
*B60K 6/28* (2007.10)
*H01M 50/24* (2021.01)

(56) References Cited

U.S. PATENT DOCUMENTS

| | | |
|---|---|---|
| 9,636,625 B2 | 5/2017 | Gless |
| 2010/0071979 A1* | 3/2010 | Heichal ................ H01M 50/20 180/68.5 |
| 2011/0005846 A1 | 1/2011 | Page et al. |
| 2014/0199566 A1* | 7/2014 | Gless ................ B01D 53/0415 429/72 |

* cited by examiner

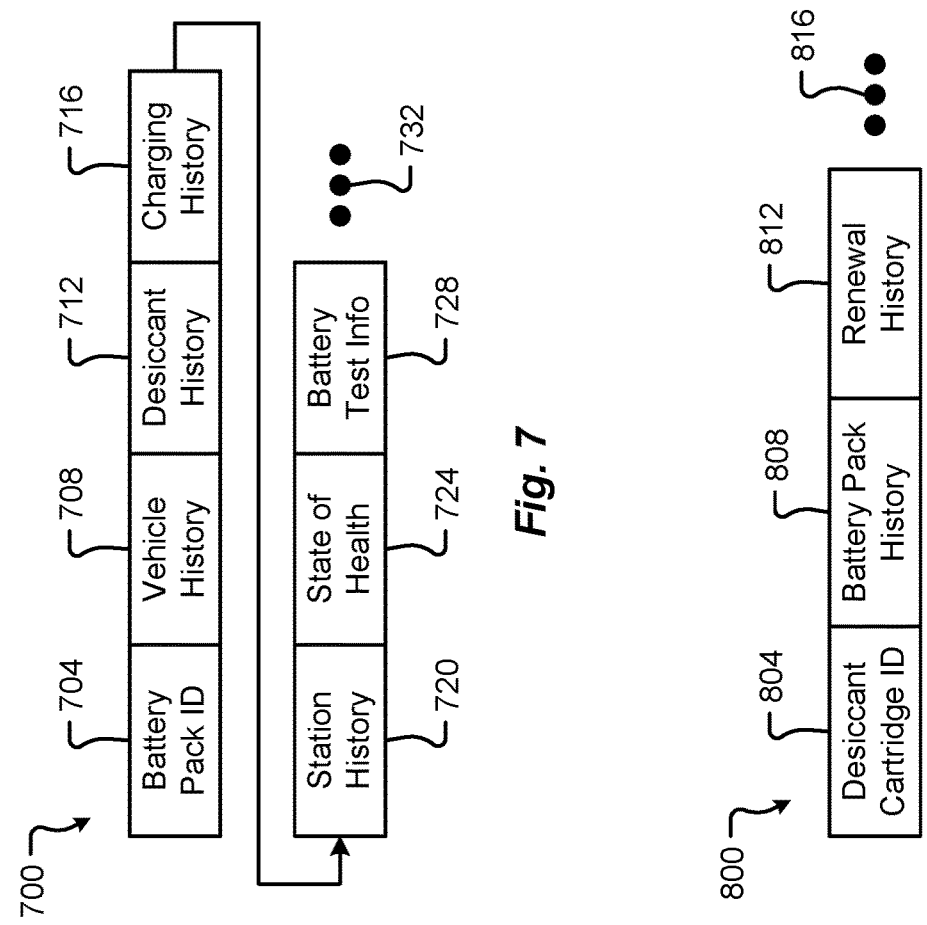
Fig. 7
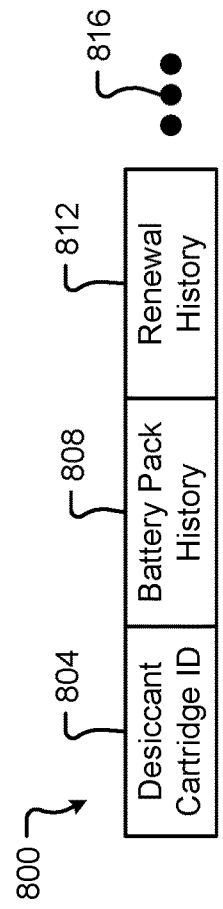
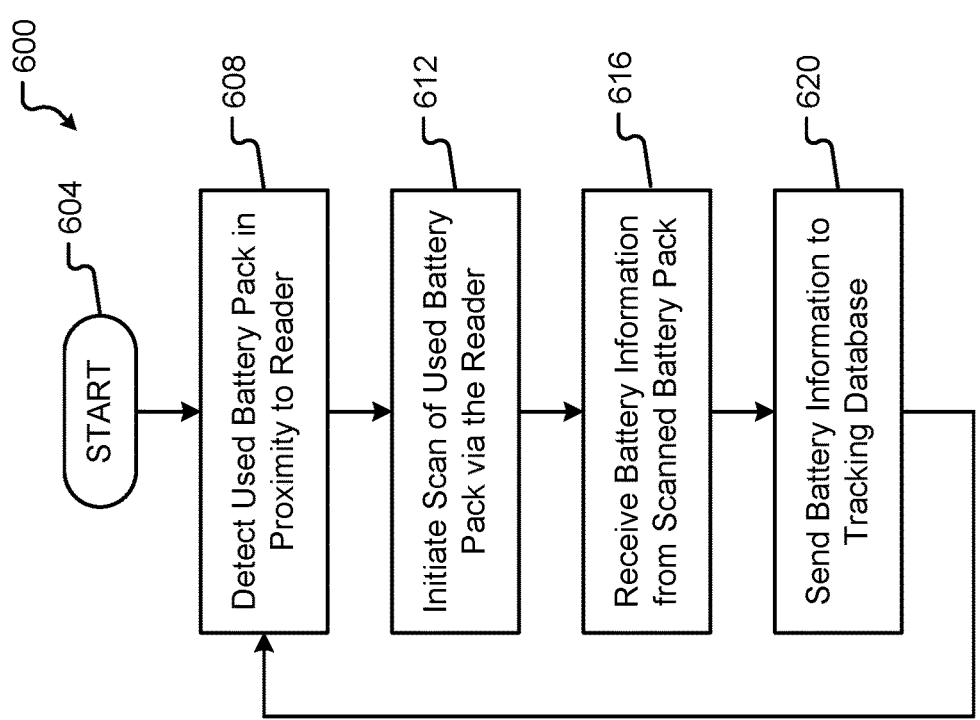
Fig. 8
Fig. 6

METHOD AND SYSTEM FOR PREVENTING MOISTURE ACCUMULATION IN BATTERY PACKS

FIELD

The present disclosure is generally directed toward controlling moisture accumulation in battery packs, and more particularly, toward preventatively renewing desiccant cartridges of battery packs.

BACKGROUND

Electric vehicle battery packs typically include a number of lithium-ion battery cells arranged inside a battery pack housing to store energy. To provide pressure equalization between the air inside and outside of a battery pack, a "breather" vent may be installed in the battery pack housing. The breather vent provides a balance of pressure by allowing gas (e.g., air, etc.) to pass through from a high-pressure side of the vent to a low-pressure side of the vent. In some cases, the breather vent may also allow water vapor to enter the battery pack.

Water vapor entering a battery pack can result in a buildup, or accumulation, of moisture. Moisture buildup and water condensation inside a battery pack can lead to a shortened battery pack lifecycle, battery pack failure, and even fires. For instance, condensing water inside a battery pack can drip into voltage-sense connectors and cause short circuits, which can lead to a battery pack fire.

Some battery packs have used desiccant material to absorb water vapor from the air to reduce condensation inside the battery pack. Because these desiccants absorb water, the desiccants need to be regularly removed from the pack and replaced.

BRIEF DESCRIPTION OF THE DRAWINGS

FIG. 6 is a flow diagram of a method for transmitting battery pack information associated with a used vehicle battery pack to a tracking database in accordance with embodiments of the present disclosure;

FIG. 7 is a block diagram depicting a first illustrative data structure used in accordance with embodiments of the present disclosure; and FIG. 8 is a block diagram depicting a second illustrative data structure used in accordance with embodiments of the present disclosure.

DETAILED DESCRIPTION

Figure 1A:
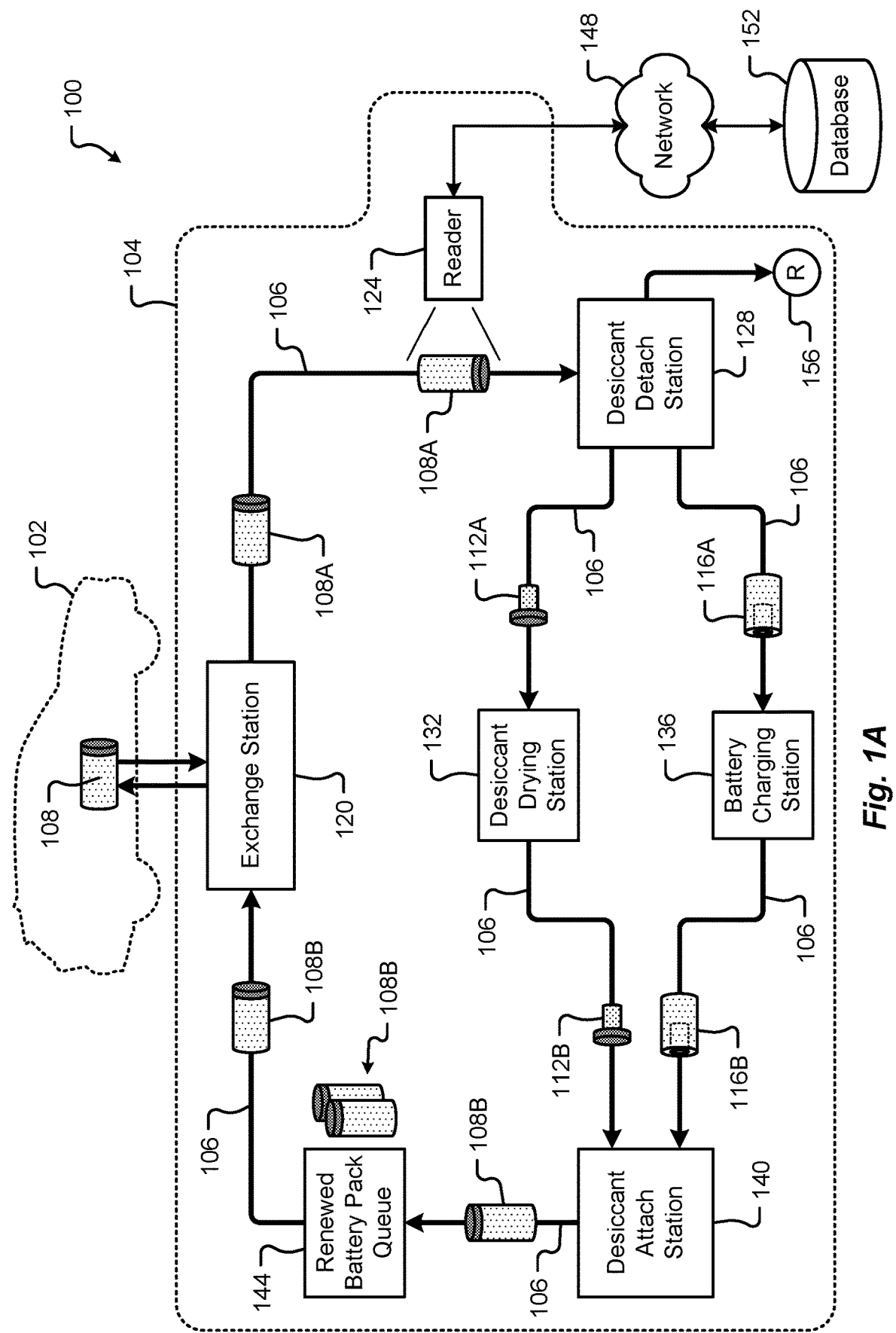
FIG. 1A shows a block diagram of a battery pack exchange and tracking system in accordance with embodiments of the present disclosure.

Embodiments of the present disclosure will be described in connection with a vehicle, and in some embodiments, an electric vehicle, rechargeable electric vehicle, and/or hybrid-electric vehicle and associated systems.

As the travel range of electric vehicles increases so does the charging time for the electric vehicle battery pack. Most consumers with interest in purchasing an electric vehicle see charging time as a major disadvantage. While a gasoline vehicle may take between 5-10 minutes to fully refuel, electric vehicles may take 30-45 minutes for a 50% refuel. To address this issue, some manufactures offer the ability to physically swap a depleted battery pack for a fully charged battery pack. A battery pack swap, or exchange, system requires a vehicle architecture that supports swapping and an infrastructure that can swap and charge battery packs efficiently. At least one major advantage of a battery exchange system includes the ability to quickly swap a battery pack from a vehicle multiple times per day, without any battery degradation as a result of repetitive charging. In addition, a battery exchange system can determine faulty battery packs that may need service or rework. In some cases, a battery pack exchange system can implement battery pack upgrades in an efficient and controlled manner.

In some embodiments, a vehicle manufacturer may own the battery packs that are exchanged with an electric vehicle. Because a battery pack may be exchanged with multiple different vehicles over time, tracking maintenance of the battery pack becomes difficult. As can be appreciated, it is critical to track a battery pack and routinely service the battery pack's desiccant to avoid malfunction or failure. In one embodiment, the methods and systems described herein provide a battery pack exchange and tracking system that can track charges, installations, a state of health over time, maintenance, and services. At least one benefit to this tracking includes ensuring that battery packs are always operating at optimal predetermined standards and are fully maintained.

The battery pack swap technology disclosed herein may be used as a charging method, and may not supersede plug-in charging of battery packs.

In some embodiments, the methods and systems described herein may automate the servicing of a battery pack's desiccant using a battery pack exchange system.

The vehicle may comprise an exchangeable (e.g., swappable) battery pack architecture. The battery pack may comprise a sealed battery pack with at least one pressure equalization vent and a serviceable desiccant cartridge design.

The battery pack exchange system may include the capability to robotically remove a used battery pack (e.g., at least partially charge-depleted) from a vehicle, remove the desiccant from the used battery pack (e.g., when the battery pack is removed from the vehicle, etc.), and install a new, and/or serviced, desiccant with a new, and/or charged, battery pack. The battery pack exchange system may install, robotically, a renewed battery pack (e.g., a charged battery pack comprising a serviced desiccant, etc.) in the vehicle. In some embodiments, the removed desiccant may be serviced (e.g., returned to a like-new condition) by replenishing, or renewing, the desiccant. Renewal may comprise drying the desiccant with a dryer (e.g., an electric heater, an oven, a hot-air gun, a dehumidifier, a centrifuge, etc., and/or combinations thereof) and/or otherwise treating the desiccant while inside a controlled environment (e.g., humidity, temperature, pressure, etc.). The battery pack exchange system may charge the removed used battery pack and store the charged battery pack for installation in another vehicle.

In one embodiment, the method may begin when an electric vehicle having a low battery state of charge (e.g., at least partially depleted) drives into an exchange station of a battery pack exchange system. The exchange station may automatically remove the depleted battery pack from the vehicle and index the depleted battery pack to a desiccant removal station. At the desiccant removal station, a desiccant cartridge may be separated from the battery pack housing and placed into a dryer for renewal (e.g., including a heater to remove moisture from the desiccant inside the desiccant cartridge). The battery pack may be indexed to a charging station for charging. In one embodiment, the dry desiccant cartridge may be reassembled with the depleted battery pack prior to, or after, charging the battery pack. In another embodiment, the dry desiccant cartridge may be assembled with another, different, battery pack prior to, or after, charging the different battery pack.

The battery pack exchange system may pick a previously renewed battery pack from a rack, or queue, and install it into the vehicle. This installation may be performed immediately after the depleted battery pack is removed from the vehicle. As can be appreciated, allowing the battery pack exchange system to install a previously renewed battery pack into the vehicle, without waiting for the depleted battery pack to be charged results in a quick and efficient battery pack swap operation. Once installed, the vehicle may drive out of the exchange station and leave the battery pack exchange system.

FIG. 1A shows a block diagram of a battery pack exchange and tracking system 100 in accordance with embodiments of the present disclosure. The battery pack exchange and tracking system 100 may include a number of systems, machines, and equipment that are installed at a facility and capable of communicating with one or more databases, servers, and systems (e.g., other facilities, manufacturers, etc.) across a communication network 148. One example of a facility of the battery pack exchange and tracking system 100 may be the battery pack exchange system 104 illustrated in FIG. 1A.

The battery pack exchange system 104 may comprise an exchange station 120, a reader 124, a desiccant detach station 128, a desiccant drying station 132, a battery charging station 136, a desiccant attach station 140, and a renewed battery pack queue 144. Each station may be associated with an area in the battery pack exchange system 104, or along the line, where at least one operation is performed. The stations may employ one or more robots (e.g., six-axis, selective compliance assembly robot arm (SCARA), gantry, cartesian coordinate, etc.), linear actuators, rotary actuators, machines, devices, systems, and/or combinations thereof that perform the described operation, function, or method. The robots and actuators may be motor driven (e.g., electric motor, air motor, etc.), gas-powered (e.g., pneumatic, compressed air, etc.), fluid-powered (e.g., hydraulic, etc.), electrically powered (e.g., solenoid, etc.), and/or combinations thereof. The stations may mimic stations of an assembly line, disassembly line, or manufacturing line. One or more of these stations may be interconnected with one another via a conveyor 106 or other material handling and/or transfer equipment. It is an aspect of the present disclosure that the stations, the conveyors 106, and/or components thereof may be controlled by one or more controllers (e.g., processors, computers, etc.). One example of a controller may be a programmable logic controller (PLC) or the like. Another example of a controller may be a computer system that is capable of providing instructions via input/output communications through a communications interface. In some embodiments, the battery pack exchange system 104 may include at least one removal area 156 where a desiccant cartridge 112 and/or a depleted battery pack subassembly 116A may be removed from the battery pack exchange system 104 flow. The battery pack exchange system 104 may communicate information about one or more components across a communication network 148 to a tracking database 152 and/or tracking server.

Figure 3:
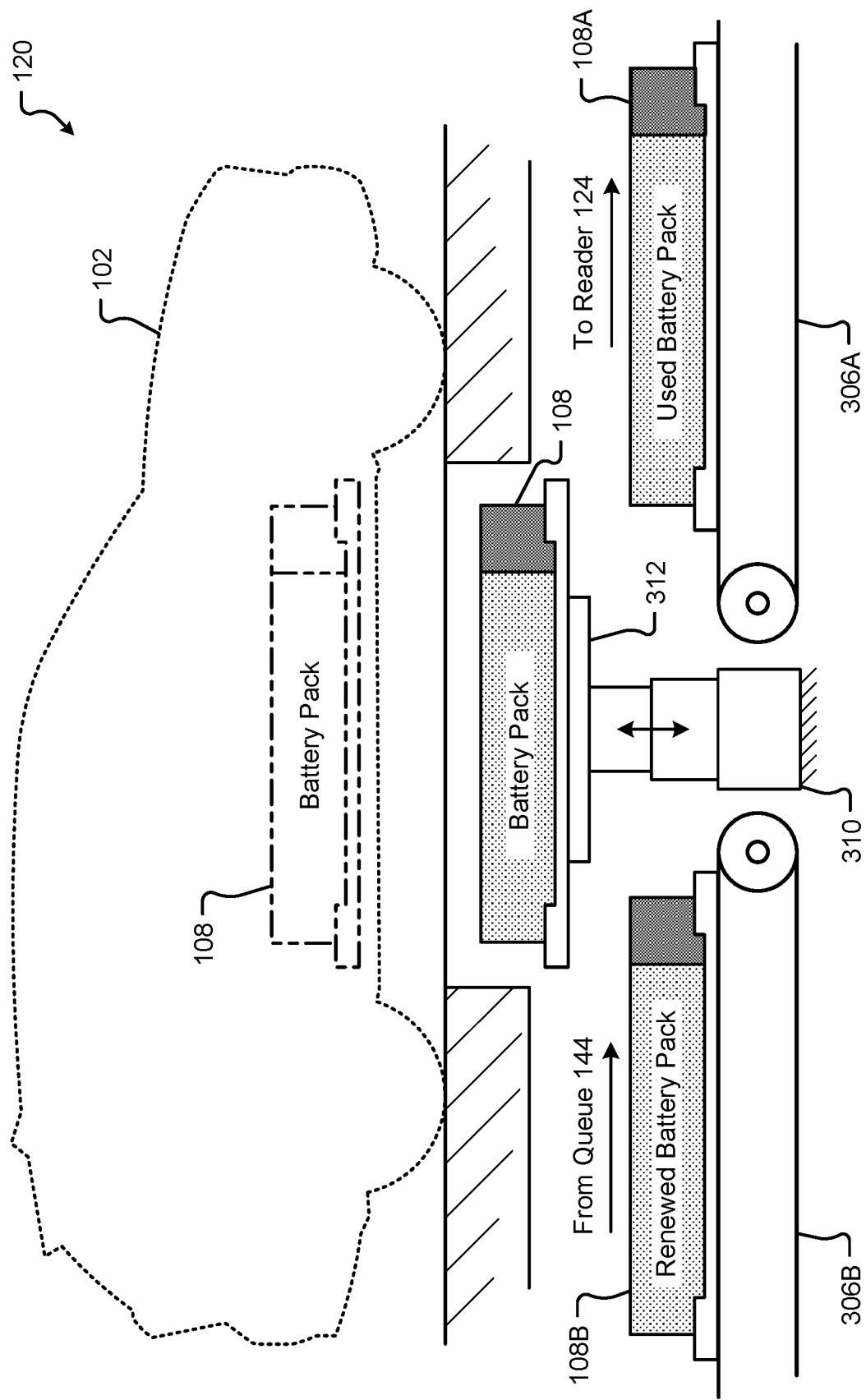
FIG. 3 shows a block diagram of an exchange station of the battery pack exchange system in accordance with embodiments of the present disclosure.

The exchange station 120, described in greater detail in conjunction with FIG. 3, may receive an electric vehicle 102 that includes a battery pack 108 or other removable/replaceable power source. The battery pack 108 may comprise the desiccant cartridge 112 and a battery pack subassembly 116. Although shown in the form of a car, it should be appreciated that the electric vehicle 102 described herein may include any conveyance or model of a conveyance, where the conveyance was designed for the purpose of moving one or more tangible objects, such as people, animals, cargo, and the like. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

In some embodiments, the battery pack 108 of the electric vehicle 102 may correspond to an at least partially depleted, or used, battery pack 108A. In one embodiment, the electric vehicle 102 may request an exchange or service of the used battery pack 108A. In response, the exchange station 120 may robotically (e.g., automatically via one or more computer-controlled machines, robots, etc.) remove a used battery pack 108A from the electric vehicle 102 and place the used battery pack 108A onto a conveyor 106, transfer table, pick-and-place system, or other material handler to transfer the used battery pack 108A from the exchange station 120 to a next station in the battery pack exchange system 104. After removing the used battery pack 108A, the exchange station 120 may robotically install a renewed battery pack 108B. The renewed battery pack 108B may correspond to a previously-charged battery pack 108 with a renewed desiccant cartridge 112B. This type of quick battery pack exchange is limited only by the amount of time required to remove the used battery pack 108A and replace it with a renewed battery pack 108B. As can be appreciated, this quick-change operation allows for an electric vehicle 102 to exchange battery packs 108 and leave the exchange station 120 without waiting for the used battery pack 108A to be recharged.

The battery pack 108 may be conveyed past a reader 124 in the battery pack exchange system 104. The reader 124 may correspond to an identification (ID) tag reader, a radio frequency (RFID) reader, an optical scanner (e.g., a barcode reader, a quick response (QR) code reader, a two-dimensional (2D) barcode reader), electronic identification (EID) and/or other type of electromagnetic (EM) reader. In some embodiments, the reader 124 may be configured to communicate (e.g., send and/or receive signals, etc.) with one or more tags (e.g., associated with parts of the battery pack 108, etc.) in a communication (e.g., scanning) range via any number of communications protocols associated with the tags. The communication range may be based on any number of communications protocols associated with the tags. Examples of communications protocols can include, but are in no way limited to, the protocol or protocols associated with near field communication (NFC), RFID (e.g., operating at 125 kHz, 13.56 kHz, etc.), Bluetooth® wireless communication, Bluetooth® Low Energy (BLE), cellular communications, Wi-Fi communications, and/or other wireless communications.

The reader 124 may scan and/or read information associated with the used battery pack 108A as the used battery pack 108A is conveyed into a communication range of the reader 124. In response to the scan initiated by the reader 124, the reader 124 may receive information associated with the used battery pack 108A. This information may be communicated across a communication network 148 to a tracking server and/or a tracking database 152 (e.g., stored on a computer-readable storage medium, or device, of a server, etc.). In some embodiments, the tracking database 152 may be remotely located from the battery pack exchange system 104. In one embodiment, the tracking database 152 may belong to a battery pack owner, a vehicle manufacturer, a maintenance service agency, and/or the like. The information may be used by the owner of the tracking database 152 to track maintenance, performance, inventory, and/or other statistics associated with battery packs 108 in use.

In accordance with at least some embodiments of the present disclosure, the communication network 148 may comprise any type of known communication medium or collection of communication media and may use any type of protocols, such as TCP/IP, SNA, IPX, AppleTalk, and the like, to transport messages between endpoints. The communication network 148 may include wired and/or wireless communication technologies. The Internet is an example of the communication network 148 that constitutes an Internet Protocol (IP) network consisting of many computers, computing networks, and other communication devices located all over the world, which are connected through many telephone systems and other means. Other examples of the communication network 148 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 148 need not be limited to any one network type, and instead may be comprised of a number of different networks and/or network types. The communication network 148 may comprise a number of different communication media such as coaxial cable, copper cable/wire, fiber-optic cable, antennas for transmitting/receiving wireless messages, and combinations thereof.

After scanning by the reader 124, the used battery pack 108A may be conveyed to a desiccant detach station 128. The desiccant detach station 128 may include at least one machine, device, or system that is capable of removing a desiccant cartridge 112 from a battery pack 108. In particular, the desiccant detach station 128 may remove a used desiccant cartridge 112A from a used battery pack 108A. A used desiccant cartridge 112A may correspond to a desiccant cartridge 112 that has accumulated moisture during installation with a battery pack 108. For instance, the desiccant detach station 128 may employ a robot that unscrews or unclips the used desiccant cartridge 112A from the used battery pack 108A. In one embodiment, a gripper may hold the used battery pack 108A while the used desiccant cartridge 112A is unscrewed, or detached, from the used battery pack 108A. In some embodiments, an automatic torque driver may engage with one or more features of the used desiccant cartridge 112A and unscrew the used desiccant cartridge 112A from the used battery pack 108A. The desiccant detach station 128 may include at least one pick-and-place system (e.g., one or more robots, linear and/or rotary pneumatic actuators arranged together, etc.) that transfers the detached used desiccant cartridge 112A onto a conveyor 106 between the desiccant detach station 128 and the desiccant drying station 132. In some embodiments, the pick-and-place system, or even a robot, may transfer the used desiccant cartridge 112A into the desiccant drying station 132. The used desiccant cartridge 112A may be placed onto a pallet or other transfer fixture prior to transferring into the desiccant drying station 132.

In some embodiments, the used battery pack 108A may remain on a conveyor and be directed, or diverted, from the desiccant detach station 128 to a battery charging station 136 or a removal area 156. The used battery pack 108A may be moved by the pick-and-place system, or robot, onto a conveyor 106 between the desiccant detach station 128 and the battery charging station 136 or the removal area 156. In some embodiments, the pick-and-place system or robot may transfer the used battery pack 108A directly into the battery charging station 136 or the removal area 156.

The removal area 156 may correspond to an area where used battery packs 108A, and/or used desiccant cartridges 112A, can be removed from the battery pack exchange system 104. By way of example, the reader 124 may scan a used battery pack 108A and determine, based on information received from the used battery pack 108A, that the used battery pack 108A has had too many previous charging operations performed, or that a state of health of the battery has diminished below acceptable predetermined thresholds. In this case, the used battery pack 108A, or a portion thereof, may be conveyed to the removal area 156 for disposition. Disposition may include reworking the used battery pack 108A, recycling the used battery pack 108A, disassembling the used battery pack 108A, and/or safely disposing of the used battery pack 108A (e.g., where a failure or safety issue is detected with the used battery pack 108A).

The separated used desiccant cartridge 112A and the remaining portion of the used battery pack 108A (e.g., the depleted battery pack subassembly 116A) may be conveyed along different paths in the battery pack exchange system 104 for further processing. For instance, the used desiccant cartridge 112A may be conveyed to the desiccant drying station 132, while the depleted battery pack subassembly 116A may be conveyed to the battery charging station 136.

Figure 4A:
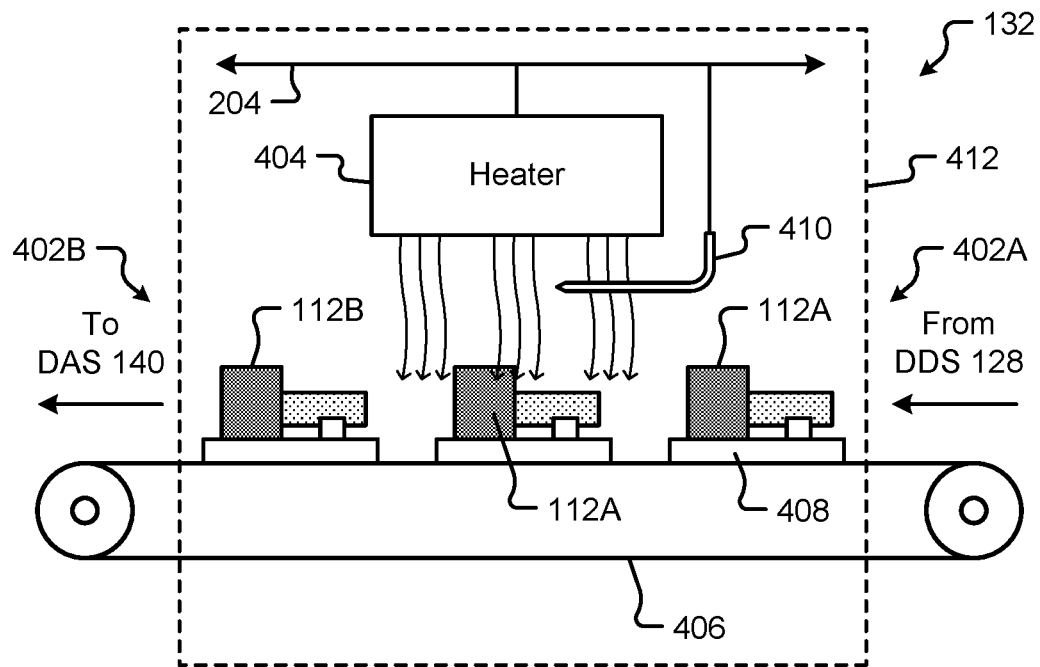
FIG. 4A shows a block diagram of a desiccant drying station of the battery pack exchange system in accordance with embodiments of the present disclosure.
Figure 4B:
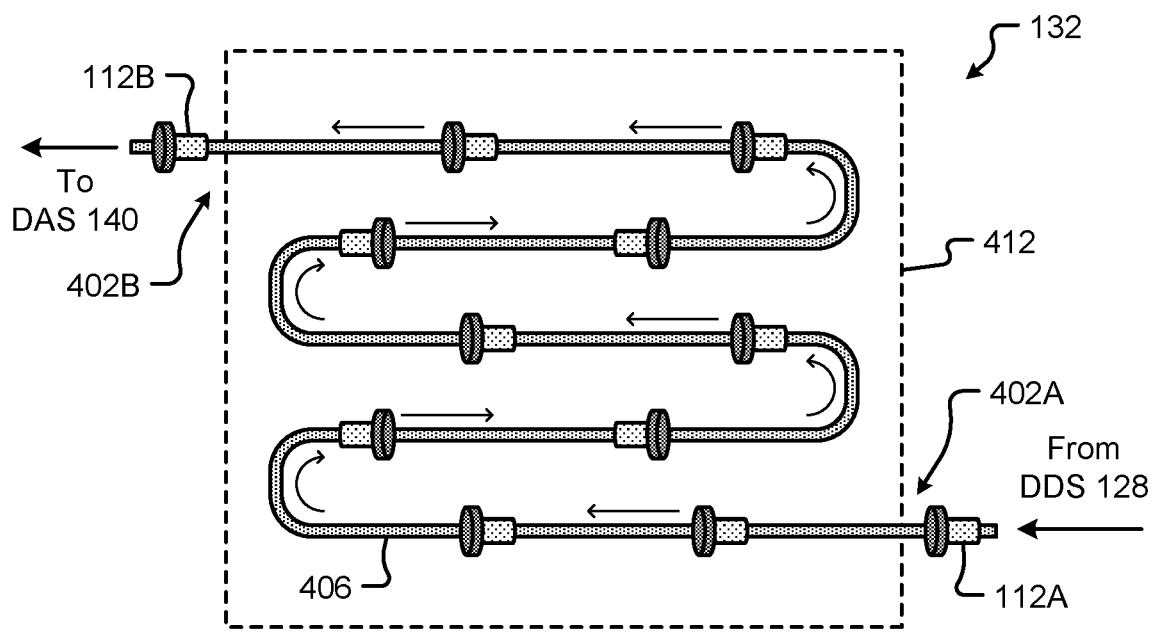
FIG. 4B shows a block diagram of desiccant cartridges moving through the desiccant drying station in accordance with embodiments of the present disclosure.

The desiccant drying station 132, described in greater detail in conjunction with FIGS. 4A-4B, may renew the used desiccant cartridge 112A by, for example, drying a desiccant material associated with the used desiccant cartridge 112A. The desiccant material may be disposed inside, on, or form a part of a desiccant cartridge 112. Examples of the desiccant material may include, but are in no way limited to, activated charcoal, alumina, bauxite, calcium chloride, montmorillonite clay, silica, and silica gel. The desiccant material may be in the form of beads, strips, particles, solid shapes, hollow shapes, and/or a combination thereof. In some embodiments, the desiccant material may be deposited onto a surface of the desiccant cartridge 112. Once dried (e.g., based on time, humidity level detection, etc.), the renewed desiccant cartridge 112B may be conveyed from the desiccant drying station 132 to the battery charging station 136.

The battery charging station 136 may comprise any battery charger (not shown) that is capable of charging the depleted battery pack subassembly 116A. In some embodiments, the battery charging station 136 may interconnect to the depleted battery pack subassembly 116A via at least one electrical interconnection. The battery charger may be connected to an electrical power source and comprise a number of circuits that control, rectify, regulate, and protect the depleted battery pack subassembly 116A being charged and/or associated equipment of the battery charging station 136. In one embodiment, the depleted battery pack subassembly 116A may be automatically connected to the battery charger via a robot, or other actuation system. For example, contact probes of the battery charger may extend into physical contact with corresponding conductive points of the depleted battery pack subassembly 116A, providing a charge path between the battery charger and the depleted battery pack subassembly 116A. Once the depleted battery pack subassembly 116A has been charged to a predetermined charge level, the charged battery pack subassembly 116B may be conveyed from the battery charging station 136 to the desiccant attach station 140.

The desiccant attach station 140 may correspond to an assembly station that integrates a renewed desiccant cartridge 112B with a charged battery pack subassembly 116B to form a renewed battery pack 108B. The renewed desiccant cartridge 112B may be reattached to the same charged battery pack subassembly 116B that the renewed desiccant cartridge 112B was previously attached to (e.g., the previously-depleted battery pack subassembly 116A) or may be attached to a completely different charged battery pack subassembly 116B (e.g., other than the previously-depleted battery pack subassembly 116A). In short, the desiccant attach station 140 may perform an opposite operation of the desiccant detach station 128 described above. For example, the desiccant attach station 140 may include at least one machine, device, or system that is capable of attaching a renewed desiccant cartridge 112B to a charged battery pack subassembly 116B. In one embodiment, the desiccant attach station 140 may employ a robot that screws or clips the renewed desiccant cartridge 112B with the charged battery pack subassembly 116B. In one embodiment, a gripper may hold a portion of the charged battery pack subassembly 116B while the renewed desiccant cartridge 112B is aligned with an opening in a battery pack housing of the charged battery pack subassembly 116B and then screwed, or attached, to the charged battery pack subassembly 116B. Similar to the tools of the desiccant detach station 128, an automatic torque driver may engage with one or more features of the renewed desiccant cartridge 112B and screw the renewed desiccant cartridge 112B to the charged battery pack subassembly 116B. The desiccant attach station 140 may include at least one pick-and-place system that transfers the renewed battery pack 108B (e.g., comprising the renewed desiccant cartridge 112B attached to the charged battery pack subassembly 116B) onto a conveyor 106 between the desiccant attach station 140 and the renewed battery pack queue 144. In some embodiments, the pick-and-place system, or even a robot, may transfer the renewed battery pack 108B directly into the renewed battery pack queue 144.

The renewed battery pack queue 144 may correspond to an accumulation conveyor, rack system, and/or other storage area capable of organizing a plurality of renewed battery packs 108B in a first in first out arrangement. In some embodiments, prior to conveying a renewed battery pack 108B from the renewed battery pack queue 144 to the exchange station 120 (e.g., for installation in an electric vehicle 102), the renewed battery pack 108B may be charged by a battery charger to an installation level of charge that is greater than the predetermined level of charge at the battery charging station 136. For instance, it may be beneficial to charge depleted battery pack subassemblies 116A at an 80%, plus or minus 10%, charge at the battery charging station 136 for storage purposes. In this instance, the renewed battery pack 108B may be fully charged (e.g., greater than 90% charge) prior to installing in an electric vehicle 102 at the exchange station 120.

In some embodiments, one or more stations in the battery pack exchange system 104 may include a reader 124 that is capable of tracking the parts of a battery pack 108 traveling through the battery pack exchange system 104. Although described as scanning used battery packs 108A entering the battery pack exchange system 104, the stations of the battery pack exchange system 104 may scan the desiccant cartridge 112 and/or the battery pack subassembly 116 at any point in the system 104. For example, the desiccant drying station 132 may include a reader 124 that scans a tag associated with the used desiccant cartridge (e.g., the desiccant cartridge information tag 162 described in conjunction with FIG. 1B). As another example, the battery charging station 136 may include a reader 124 that scans a tag associated with the depleted battery pack subassembly 116A (e.g., the battery pack information tag 122 described in conjunction with FIG. 1B). As yet another example, the desiccant attach station 140 may include a reader 124 that scans each of the renewed desiccant cartridge 112B and the charged battery pack subassembly 116B prior to, or after, attaching the components together forming the renewed battery pack 108B. The exchange station 120 may scan renewed battery pack 108B prior to installing the renewed battery pack 108B in an electric vehicle 102. In any event, this scanned information may be sent, across the communication network 148, to the tracking database 152 for tracking purposes and/or storage.

Figure 1B:
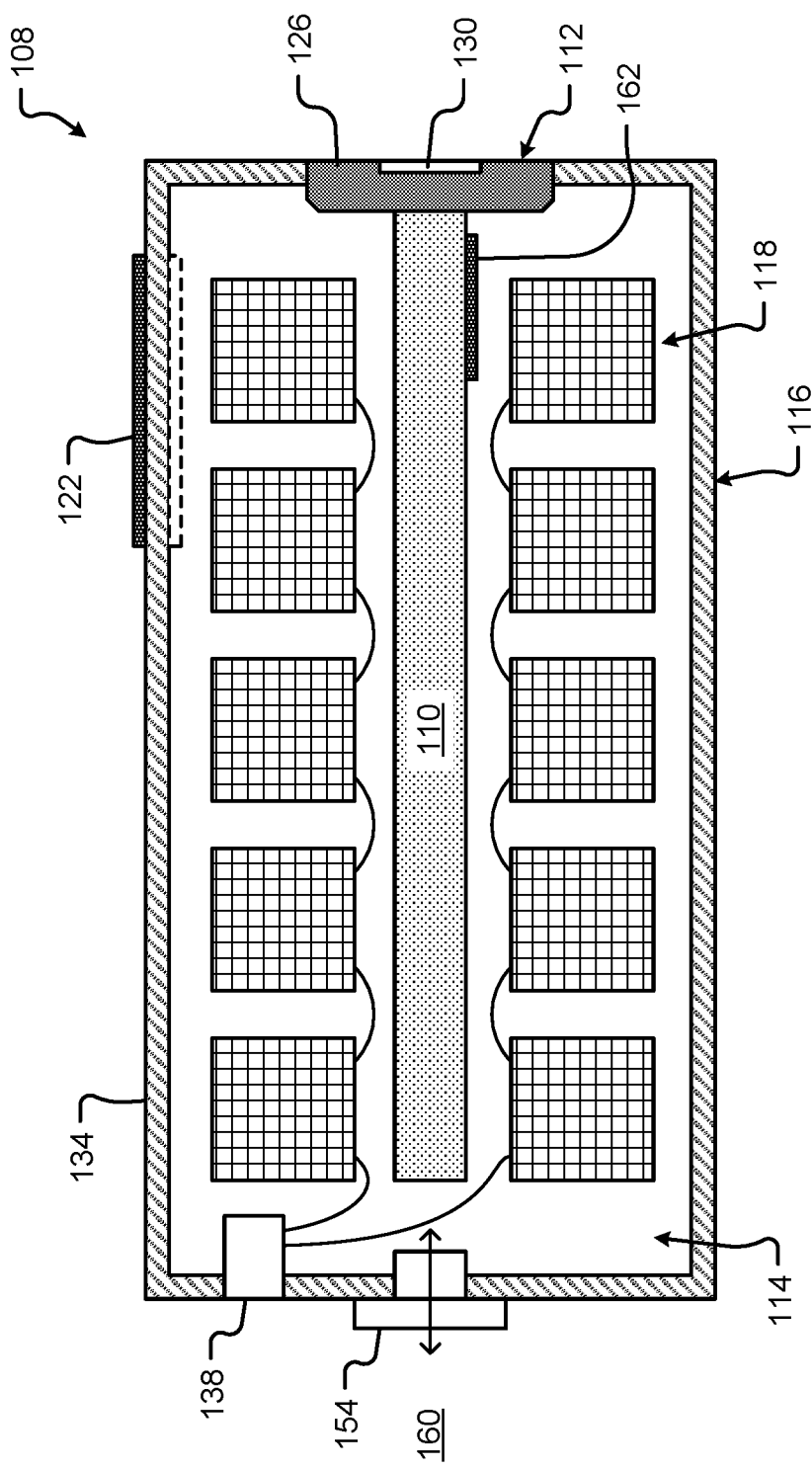
FIG. 1B shows an example of a battery pack in the battery pack exchange and tracking system in accordance with embodiments of the present disclosure.

Referring now to FIG. 1B, an example of a battery pack 108 in the battery pack exchange and tracking system 100 is shown in accordance with embodiments of the present disclosure. The battery pack 108 illustrated in FIG. 1A shows the components of the various battery packs 108, 108A, 108B described in present disclosure. The battery pack 108 may correspond to a complete battery pack assembly comprising a desiccant cartridge 112 and a battery pack subassembly 116. Although described as a "subassembly," it should be appreciated that the battery pack subassembly 116 is, in fact, a battery pack comprising all of the components necessary to receive charge and/or produce energy for an electric vehicle 102. However, the battery pack subassembly 116 may correspond to a battery pack without a desiccant cartridge 112 (e.g., a battery pack that has been separated from a desiccant cartridge 112). In the present disclosure, the battery pack 108 may comprise the battery pack subassembly 116 and the desiccant cartridge 112, assembled together.

The battery pack subassembly 116 comprises a housing 134 forming an exterior of the battery pack 108. The housing 134 comprises an inner compartment 114 that is at least partially sealed from an exterior environment 160 of the battery pack 108. In one embodiment, a pressure balancing vent 154 may be disposed in at least one sidewall of the housing 134 to provide a balance of pressure between the inner compartment 114 and the exterior environment 160. The pressure balancing vent 154 may comprise at least one vent membrane that allows gas, or air, to pass therethrough (e.g., shown by the arrow spanning the pressure balancing vent 154 from the inner compartment 114 to the exterior environment 160). The vent membrane may comprise a sized porous structure that prevents particulate larger than a certain dimension from passing therethrough. In some cases, the vent membrane may limit the amount of moisture that is capable of entering the housing 134 of the battery pack subassembly 116 and battery pack 108.

The battery pack subassembly 116 may comprise a plurality of battery modules 118 disposed inside the inner compartment 114 of the housing 134. Each battery module 118 of the plurality of battery modules 118 may comprise a plurality of battery cells (e.g., cylindrical battery cells, lithium-ion battery cells, etc.). The plurality of battery modules 118 may be electrically interconnected to one another (e.g., in series and/or in parallel) and configured to provide and/or receive charge via an electrical connection 138. The electrical connection 138 may include one or more conductive elements (e.g., plugs, probes, receptacles, etc.) that enable interconnection with the battery charger described herein and/or an electrical interconnection of the electric vehicle 102.

The battery pack 108 comprises a desiccant cartridge 112 attached to a portion of the housing 134. As shown in FIG. 1B, the desiccant cartridge 112 is attached to the housing 134 such that a desiccant material 110 of the desiccant cartridge 112 is disposed inside the inner compartment 114 adjacent to the battery modules 118. The desiccant cartridge 112 is attached to the housing 134 via a locking portion 126 of the desiccant cartridge 112. The locking portion 126 may correspond to a threaded, quarter-lock, or other twist-lock feature that engages with respective features in the housing 134. For instance, the locking portion 126 may be arranged as a cylindrical member having outer threads that engage with threads disposed in an opening of a sidewall of the housing 134. The desiccant cartridge 112 may comprise one or more tool engagement features 130 that are capable of transmitting force from an attachment and/or detachment tool (e.g., automatic torque driver, etc.). In one embodiment, the tool engagement feature 130 may correspond to a slot, a shaped cutout (e.g., star, tri-lobe, hex-head, security lock shape, etc., and/or combinations thereof), protrusion, key, or other relieved or extruded area on a body of the desiccant cartridge 112. In the event that the tool engagement feature 130 is a slot, or similar recessed feature, a corresponding tool (e.g., bit, driver, etc.) of the automatic torque driver associated with the desiccant detach station 128 and/or the desiccant attach station 140 may engage with the slot and automatically unscrew and/or screw the desiccant cartridge 112 relative to the battery pack subassembly 116.

In some embodiments, the battery pack 108 may include a battery pack information tag 122 disposed on, or in, the housing 134. The battery pack information tag 122 may correspond to a barcode, 2D code, RFID tag, NFC tag, etc., and/or combinations thereof. The battery pack information tag 122 may comprise information about the battery pack 108, the battery pack subassembly 116, and/or the desiccant cartridge 112. This information may be referred to as battery information. Examples of this battery information are described in conjunction with FIGS. 7 and 8. In one embodiment, the battery pack subassembly 116 and the desiccant cartridge 112 may each include an information tag 122, 162, respectively. The battery pack information tag 122 may be used to track the battery pack 108 and/or the battery pack subassembly 116 traveling through the battery pack exchange system 104. The desiccant cartridge information tag 162 may be used to track the desiccant cartridge 112 traveling through the battery pack exchange system 104, when separated from the battery pack subassembly 116.

Figure 2:
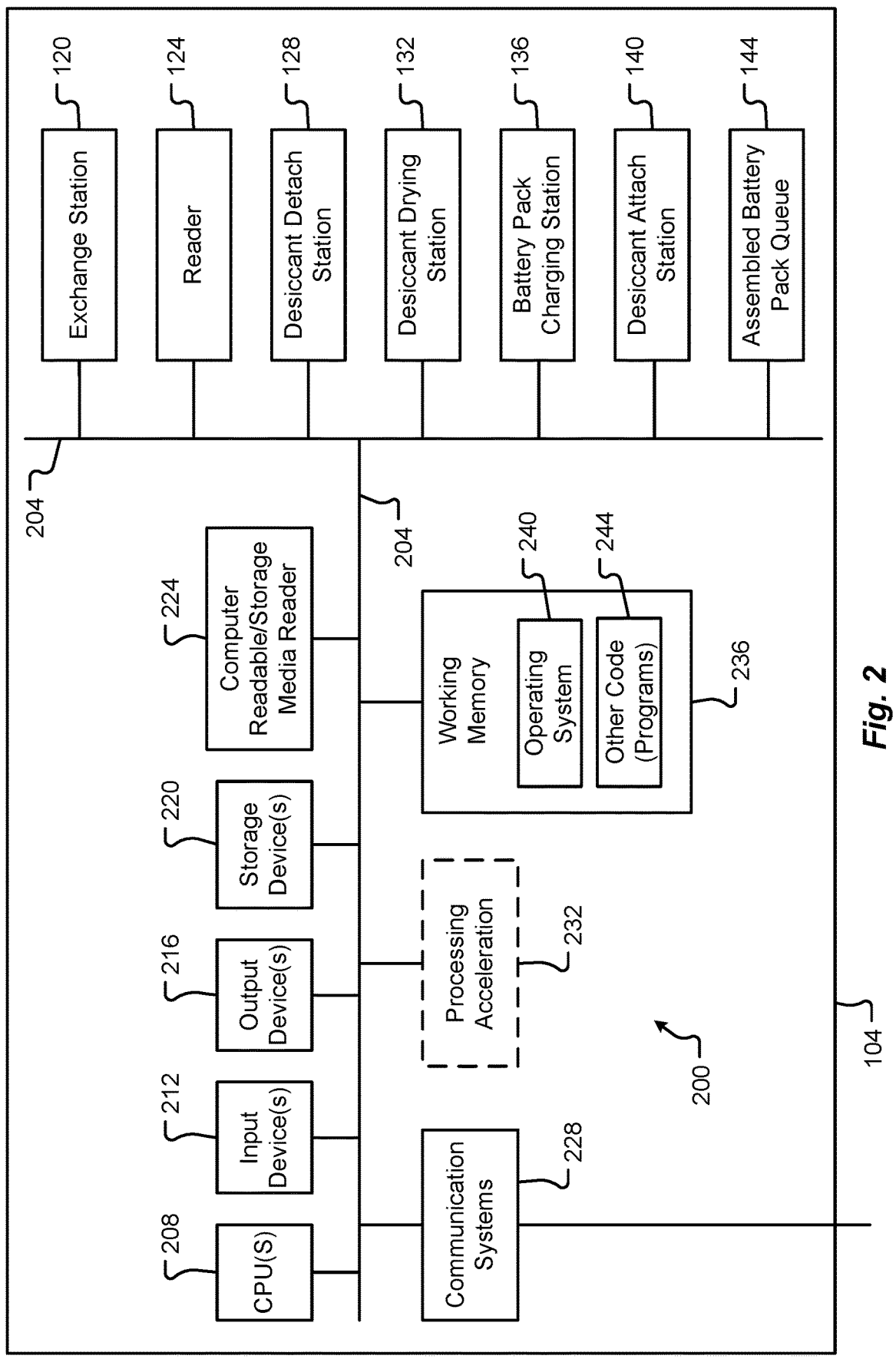
FIG. 2 shows a schematic block diagram of a battery pack exchange system in accordance with at least some embodiments of the present disclosure.

FIG. 2 shows a schematic block diagram of a battery pack exchange system 104 in accordance with embodiments of the present disclosure. The battery pack exchange system 104 may include a computer system 200 upon which the servers, computers, computing devices, controllers, or other systems or components described herein may be deployed or executed. The computer system 200 is shown comprising hardware elements that may be electrically coupled via a bus 204. The hardware elements may include one or more central processing units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a random-access memory ("RAM") and/or a read-only memory ("ROM"), which can be programmable, flash-updateable and/or the like.

The computer system 200 may additionally include a computer-readable storage media reader 224; a communications system 228 (e.g., a modem, a network card (wireless or wired), an infra-red communication device, a communication interface, etc.); and working memory 236, which may include RAM and ROM devices as described above. The computer system 200 may also include a processing acceleration unit 232, which can include a DSP, a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a communication network 148 and/or any other computer or server described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The computer system 200 may communicate with one or more of the stations and equipment of the battery pack exchange system 104 via the bus 204. The bus 204 may correspond to a communications bus and/or a power bus. In some embodiments, each station may comprise a processor or controller that, when directed by the computer system 200, performs a respective operation or combination of operations.

Referring now to FIG. 3, a block diagram of an exchange station 120 of the battery pack exchange system 104 is shown in accordance with embodiments of the present disclosure. In some embodiments, an electric vehicle 102 may comprise a vehicle power source, or battery pack 108. The battery pack 108 may include, but is in no way limited to, a battery, supercapacitor, capacitor, pack or set thereof, etc., and/or combinations thereof. In any event, a battery pack 108 may be associated with a power output and a capacity of charge. This capacity may depend on a number of available cells, power storage units, and/or other availability of the battery pack 108 to provide a power output to one or more components of the electric vehicle 102 over time. The battery pack 108 may be controlled by an on-board controller and/or a power management controller of the electric vehicle 102. In some cases, the on-board power controller may be responsible for maintaining portions of the battery pack 108, while power management controller may include one or more components used in regulating power output, voltage, and/or other signals from the battery pack 108.

In some embodiments, the electric vehicle 102 may exchange a used, or at least partially depleted, battery pack 108A for a replacement renewed battery pack 108B. By way of example, a used battery pack 108A that is depleted of usable charge may be exchanged with a renewed battery pack 108B having a usable charge (e.g., a charge capable of powering one or more components of the electric vehicle 102). The battery pack 108 may be exchanged at the exchange station 120 as shown in FIG. 3.

In one example, an electric vehicle 102 may drive into the exchange station 120 and park the electric vehicle 102 in an exchange position, or orientation. This position may orient the electric vehicle 102 adjacent to a robotic, or automatic, battery pack exchange machine. For instance, the exchange station 120 may comprise at least one mechanism (e.g., robot, pick-and-place, automatic torque driver, linear actuator, etc.) configured to remove a used battery pack 108A from an electric vehicle 102 and replace the removed used battery pack 108A with a renewed battery pack 108B. In some embodiments, the exchange station 120 may include one or more transfer systems, conveyors 306A, 306B, lifts 310, trays 312, actuators, mechanisms, and/or the like. The conveyors 306A-306B may correspond to the one or more of the conveyors 106, or portions thereof, as described herein. The conveyors 306A-306B may comprise an exchange outfeed conveyor 306A and an exchange infeed conveyor 306B. Once the electric vehicle 102 is positioned in an exchange position, the mechanical lift 310 may actuate and position a battery pack support tray 312 into proximity with the used battery pack 108A. In some embodiments, one or more automatic torque drivers may unfasten the used battery pack 108A from the electric vehicle 102. The unfastened used battery pack 108A may be contacted by the support tray 312 and then lowered (e.g., via retracting the mechanical lift 310, etc.) separating the used battery pack 108A from the electric vehicle 102. The exchange station 120 may index the used battery pack 108A to the next station (e.g., the reader 124 and/or the desiccant detach station 128) in the battery pack exchange system 104. As the used battery pack 108A is indexed off of the support tray 312, a renewed battery pack 108B may be indexed onto the support tray 312. Next, the mechanical lift 310 may lift the renewed battery pack 108B into the electric vehicle 102 (in a position shown in phantom lines). In this position, the one or more automatic torque drivers may fasten, bolt, screw, or otherwise attach the renewed battery pack 108B to the electric vehicle 102. This exchange may be performed automatically by the system exchange station 120 in a matter of minutes or seconds. As can be appreciated, the battery pack 108 may employ a number of features to interconnect with the electric vehicle 102 (e.g., kinematic features, positive location features, poka-yoke features, combinations thereof, and/or the like).

As illustrated in FIG. 3, the battery pack 108 shown on the support tray 312 may be used to represent the used battery pack 108A in an intermediate lift position as the mechanical lift 310 lowers the used battery pack 108A from the electric vehicle 102 in a direction toward the exchange outfeed conveyor 306A. Additionally or alternatively, the battery pack 108 shown on the support tray 312 may be used to represent the renewed battery pack 108B in an intermediate lift position as the mechanical lift 310 raises (e.g., actuates) the renewed battery pack 108B from the exchange infeed conveyor 306B in a direction toward the installed position in the electric vehicle 102 (e.g., shown in the phantom lines). Accordingly, depending on the operation, the battery pack 108 on the support tray 312 may correspond to the used battery pack 108A or the renewed battery pack 108B.

FIGS. 4A-4B show block diagrams of a desiccant drying station 132 in accordance with embodiments of the present disclosure. The desiccant drying station 132 may comprise a drying conveyor 406 that conveys the used desiccant cartridge 112A through the heated environment 412. The drying conveyor 406 may correspond to at least one of the conveyors 106, or a portion thereof, described in conjunction with FIG. 1A. The used desiccant cartridge 112A may be conveyed through the desiccant drying station 132 on a pallet 408. The pallet 408 may correspond to a pallet used in a power and free conveyor system. In any event, the pallet 408 may support the desiccant cartridge 112 and/or allow ample air flow around the desiccant material 110 of the desiccant cartridge 112. In some embodiments, the used desiccant cartridge 112A may be conveyed through the environment in a circuitous path from the entrance 402A to the exit 402B of the heated environment 412. As shown in FIG. 4B, the circuitous path is in a serpentine shape. This circuitous path provides a route for the used desiccant cartridge 112A to travel inside the heated environment 412 that is longer than a direct route from the entrance 402A to the exit 402B. Among other things, this circuitous path provides ample time for the used desiccant cartridge 112A to dry while inside the heated environment 412. The heated environment 412 may correspond to a temperature-controlled heated chamber. The entrance 402A may correspond to an opening in a wall of the chamber and the exit 402B may correspond to an opening in another wall of the chamber.

As shown in FIG. 4A, the desiccant drying station 132 may include a heater 404 that directs heat in a direction toward the used desiccant cartridge 112A. The heater 404 may correspond to any known heater 404 that generates dry heat via convective and/or radiant heat transfer. Examples of the heater 404 may include, but are in no way limited to, one or more cartridge heaters, ceramic heaters, electric heaters, strip heaters, any other heaters that convert electrical energy into heat energy, etc., and/or combinations thereof. In some embodiments, the heater 404 may comprise a fan that directs the heated air in a direction toward the used desiccant cartridge 112A passing through the heated environment 412. The desiccant drying station 132 may include a temperature sensor 410 that measures a temperature inside the heated environment 412. In one embodiment, the temperature sensor 410 may measure a heat output from the heater 404. The temperature sensor 410 may correspond to, but is in no way limited to, a resistive temperature detector, thermistor (e.g., positive temperature coefficient (PTC) thermistor, negative temperature coefficient (NTC) thermistor, etc.), thermocouple, thermometer, thermostat, etc., and/or combinations thereof. In some embodiments, the temperature sensor 410 may measure and even report a potential difference between two dissimilar metals that are exposed to a temperature sensing environment (e.g., the heated environment 412). In one embodiment, the temperature sensor 410 may monitor a change in the volume of a fluid that is subjected to a change in temperature (e.g., a mercury or alcohol thermometer, etc.) via a photosensor and a measurement scale or reference.

The output of and functioning of the heater 404 may be controlled by a controller (e.g., operatively connected to the heater 404 and the temperature sensor 410). The controller may correspond to one or more of the CPU(s) 208 of the computer system 200, and in some cases may correspond to a proportional-integral-derivative (PID) controller. In any event, the controller may maintain the temperature in the heated environment 412 within a predetermined drying temperature range. In some embodiments, the used desiccant cartridge 112A may be maintained inside the heated environment 412 for a predetermined period of time required to completely dry and renew the desiccant material 110 associated therewith. In this case, the speed of the drying conveyor 406 may be adjusted (e.g., via the computer system 200, etc.) such that the used desiccant cartridge 112A travels along a path inside the heated environment 412 from the entrance 402A to the exit 402B in the predetermined time.

Figure 5:
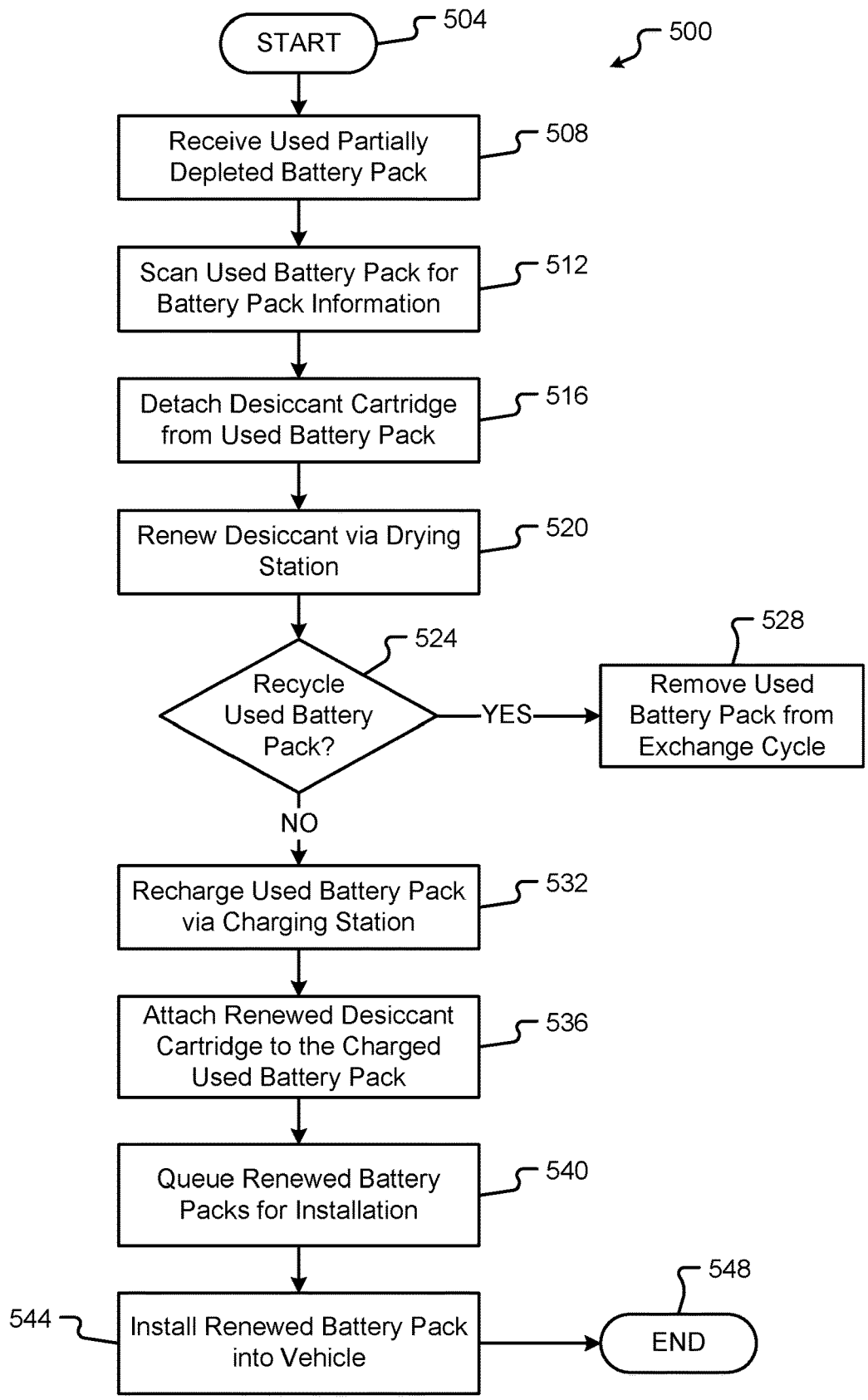
FIG. 5 is a flow diagram of a method for exchanging a used vehicle battery pack with a renewed battery pack in accordance with embodiments of the present disclosure.

FIG. 5 is a flow diagram of a method 500 for exchanging a used vehicle battery pack 108A with a renewed battery pack 108B in accordance with embodiments of the present disclosure. While a general order for the steps of the method 500 is shown in FIG. 5, the method 500 can include more or fewer steps or can arrange the order of the steps differently than those shown in FIG. 5. Generally, the method 500 starts with a start operation 504 and ends with an end operation 548. The method 500 can be executed as a set of computer-executable instructions executed by a computer system (e.g., computer system 200, station controllers, etc.) and encoded or stored on a computer readable medium (e.g., memory 236, etc.). Hereinafter, the method 500 shall be explained with reference to the systems, components, assemblies, devices, environments, etc. described in conjunction with FIGS. 1-4B.

The method 500 may begin at step 504 and proceed by receiving a used battery pack 108A from an electric vehicle 102 (step 508). In some embodiments, the method 500 may include receiving the electric vehicle 102 at the exchange station 120 of the battery pack exchange system 104, removing the used battery pack 108A from the electric vehicle 102, and installing a renewed battery pack 108B in the electric vehicle 102. This removed used battery pack 108A may be conveyed in the battery pack exchange system 104 along one or more conveyors 106. The used battery pack 108A may correspond to an at least partially depleted battery pack 108.

Next, the method 500 may proceed by scanning the used battery pack 108A for battery pack information (step 512). In some embodiments, the scanning may be performed by the reader 124 scanning the battery pack information tag 122 attached to a portion of the used battery pack 108A. The battery pack information tag 122 may be optically scanned or RF scanned by the reader 124. In some embodiments, the battery pack information tag 122 may be disposed inside the housing 134 of the used battery pack 108A. The battery pack information may be used to determine whether any portion of the used battery pack 108A is allowed to progress through the battery pack exchange system 104 (e.g., allowing a depleted battery pack subassembly 116A to proceed to a battery charging station 136, a used desiccant cartridge 112A to be renewed by the desiccant drying station 132, etc.) or be removed from the battery pack exchange system 104. In some embodiments, the used battery pack 108A may need to be completely removed from the battery pack exchange system 104. In some embodiments, the battery pack information may be stored in a memory of the computer system 200 and/or communicated to a tracking database 152.

The method 500 continues by conveying the used battery pack 108A to a desiccant detach station 128 (step 516). At the desiccant detach station 128, the used desiccant cartridge 112A is removed from the used battery pack 108A leaving the depleted battery pack subassembly 116A separate from the used desiccant cartridge 112A. This operation may be performed by a SCARA robot, a six-axis robot, and/or other system of actuators employing, for example, an automatic torque driver that engages with the tool engagement feature 130 of the used desiccant cartridge 112A and applies a controlled force (e.g., a rotational force) to separate (e.g., unscrew) the used desiccant cartridge 112A from the depleted battery pack subassembly 116A of the used battery pack 108A. Once the used desiccant cartridge 112A has been removed from the depleted battery pack subassembly 116A, the used desiccant cartridge 112A may be conveyed to the desiccant drying station 132.

The desiccant drying station 132 receives the used desiccant cartridge 112A and renews the used desiccant cartridge 112A by drying the desiccant material 110 of the used desiccant cartridge 112A via a heater 404 (step 520). In some embodiments, the used desiccant cartridge 112A may be conveyed through a heated environment 412 of the desiccant drying station 132 via a drying conveyor 406. As the used desiccant cartridge 112A passes through the heated environment 412, the heater 404 dries any moisture collected and/or stored in the desiccant material 110 of the used desiccant cartridge 112A. The used desiccant cartridge 112A may remain inside the heated environment 412 for a predetermined amount of drying time. This predetermined amount of drying time may be based on a maximum saturation level for the desiccant material 110. As long as the moisture retention of the used desiccant cartridge 112A is lower than the maximum saturation level for the desiccant material 110, which it must be, the desiccant material 110 of the used desiccant cartridge 112A will dry by the time the used desiccant cartridge 112A leaves the heated environment 412. Among other things, this approach provides a consistent and simple method for ensuring every used desiccant cartridge 112A that passes through the desiccant drying station 132 will be completely dried and renewed.

In some embodiments, the method 500 may determine whether to recycle the used battery pack 108A, the depleted battery pack subassembly 116A, and/or the used desiccant cartridge 112A (step 524). This determination may be based on the battery pack information received from the scan performed in step 512. For instance, if the battery pack information indicates that the used battery pack 108A, or any part thereof, has been charged or renewed too many times, or that the state of health of the used battery pack 108A has diminished below a predetermined acceptable threshold level, the used battery pack 108A may need to be removed from the battery pack exchange system 104. In this case, the used battery pack 108A, the depleted battery pack subassembly 116A, and/or the used desiccant cartridge 112A may be diverted from the conveyor 106 to a removal area 156 for further processing. The further processing may include disassembly, repair, and/or disposal. In any event, the removed components may be directed for recycling and/or reuse where possible.

The method 500 continues by recharging the depleted battery pack subassembly 116A via the battery charging station 136 (step 532). It should be appreciated, that the depleted battery pack subassembly 116A may be recharged without the used desiccant cartridge 112A or a renewed desiccant cartridge 112B. In some embodiments, a renewed desiccant cartridge 112B may be attached to the depleted battery pack subassembly 116A prior to recharging the depleted battery pack subassembly 116A. In any event, the plurality of battery modules 118 in the depleted battery pack subassembly 116A are recharged to a predetermined charge level, or percentage of charge. This predetermined charge level may be less than 100%, or full charge, in some cases.

The renewed desiccant cartridge 112B may be reattached to the charged battery pack subassembly 116B or attached to a completely different charged battery pack subassembly 116B (step 536). In some embodiments, it may be beneficial to keep a particular desiccant cartridge 112 with a particular battery pack subassembly 116. However, as long as the desiccant cartridge 112 is interchangeable with different battery pack subassemblies 116, there is no need to keep the same desiccant cartridge 112 with the same battery pack subassembly 116. Attaching the renewed desiccant cartridge 112B to the charged battery pack subassembly 116B may be an opposite operation than that described in conjunction with step 516. For instance, at the desiccant attach station 140, the renewed desiccant cartridge 112B is attached the charged battery pack subassembly 116B such that the desiccant material 110 of the renewed desiccant cartridge 112B is disposed inside the charged battery pack subassembly 116B. This operation may be performed by a SCARA robot, a six-axis robot, and/or other system of actuators employing, for example, an automatic torque driver that aligns the renewed desiccant cartridge 112B with an opening in the housing 134 of the charged battery pack subassembly 116B, inserts a portion of the renewed desiccant cartridge 112B comprising the desiccant material 110 through the opening, and applies a controlled force (e.g., a rotational force) to fasten the renewed desiccant cartridge 112B to the charged battery pack subassembly 116B forming the renewed battery pack 108B. Once the renewed desiccant cartridge 112B has been attached to the charged battery pack subassembly 116B, the renewed battery pack 108B may be conveyed to the renewed battery pack queue 144.

The renewed battery pack 108B, and other renewed battery packs 108B, may be queued at the renewed battery pack queue 144 (step 540). The renewed battery pack queue 144 may correspond to an accumulation storage area that stores the plurality of renewed battery packs 108B in a first in first out arrangement. This arrangement allows the exchange station 120 to access and install a selected renewed battery pack 108B that first entered the renewed battery pack queue 144 first while other renewed battery packs 108B are stored behind the selected renewed battery pack 108B. In some embodiments, the renewed battery pack queue 144 may correspond to an accumulation conveyor, a rack system, and/or other storage area.

The method 500 continues by accessing a renewed battery pack 108B from the renewed battery pack queue 144 and installing the renewed battery pack 108B into an electric vehicle 102 parked at the exchange station 120 (step 544). This electric vehicle 102 may be different from electric vehicle 102 from which the used battery pack 108A was removed. As can be appreciated, the time to renew the used desiccant cartridge 112A and the depleted battery pack subassembly 116A via the battery pack exchange system 104 may be a number of hours. Accordingly, a first used battery pack 108A may be removed from a first electric vehicle 102 (and a different renewed battery pack 108B may be installed in the first electric vehicle 102) and the first electric vehicle 102 may leave the exchange station 120). After the first used battery pack 108A is renewed, the renewed battery pack 108B may be subsequently installed in a second electric vehicle 102 (e.g., that is different from the first electric vehicle 102) that arrives at the exchange station 120 at a time after the first electric vehicle 102 has left the exchange station 120. In this way, the exchange system may process the swapping of battery packs 108 in an efficient and organized manner. The method 500 ends at step 548 or repeats at step 504 by receiving a new used battery pack 108A.

FIG. 6 is a flow diagram of a method 600 for transmitting battery pack information associated with a used battery pack 108A to a tracking database 152 in accordance with embodiments of the present disclosure. While a general order for the steps of the method 600 is shown in FIG. 6, the method 600 can include more or fewer steps or can arrange the order of the steps differently than those shown in FIG. 6. Generally, the method 600 starts with a start operation 604 and ends, or repeats, after the battery pack information is sent. The method 600 can be executed as a set of computer-executable instructions executed by a computer system (e.g., computer system 200, station controllers, etc.) and encoded or stored on a computer readable medium (e.g., memory 236, etc.). Hereinafter, the method 600 shall be explained with reference to the systems, components, assemblies, devices, environments, etc. described in conjunction with FIGS. 1-5.

The method 600 may begin at step 604 and proceed by detecting a used battery pack 108A in proximity to the reader 124 (step 608). In some embodiments, this step may correspond to step 512 of the method 500 described in conjunction with FIG. 5. Detection of the used battery pack 108A may be based on a signal received from a proximity sensor disposed adjacent the conveyor 106. In one embodiment, the detection of the used battery pack 108A may be based on a response from the battery pack information tag 122 to an interrogation signal sent by the reader 124. For instance, the reader 124 may be an RFID reader that sends interrogation signals in the form of emitted radio waves. In response to receiving the interrogation signal, the battery pack information tag 122, when configured as an RFID tag, will emit a response signal. This response signal may indicate to the reader 124 that a used battery pack 108A is in proximity to the reader 124.

Next, the method 600 proceeds by initiating a scan of the used battery pack 108A (step 612). This scan may correspond to an optical scan of a code (e.g., barcode, 2D code, QR code, etc.) displayed on the battery pack information tag 122. In some embodiments, the scan may correspond to an RF scan of the battery pack information tag 122. In any event, the scan may allow the reader 124 to read information stored in the battery pack information tag 122. This information may be stored in content displayed on the battery pack information tag 122 or in one or more memory locations (e.g., electronic product code (EPC) memory, tag ID (TID) memory, user memory, reserved memory, etc.) and/or other computer-readable storage medium of the battery pack information tag 122. The battery pack information may be obfuscated, coded, or encrypted to unauthorized parties. For instance, absent an authorized scan/request for the battery pack information, the battery pack information tag 122 cannot provide the battery pack information. The authorized scan/request may include a portion of a key or code that allows the battery pack information tag 122 to respond with the battery pack information.

In response to the scan, the reader 124 may receive the battery pack information from the used battery pack 108A (step 616). More specifically, the battery pack information associated with the battery pack information tag 122 of the used battery pack 108A may be received by the reader 124. In some embodiments, the battery pack information may be received in the form of a bit sequence, message, data packet, or datagram sent by the battery pack information tag 122. In one embodiment, the battery pack information, or at least a portion thereof, may be organized in a data structure, as described in conjunction with FIG. 7.

The method 600 proceeds by sending the battery pack information to a tracking database 152 (step 620). The battery pack information may be sent by the computer system 200 via at least one communications interface of the communications systems 228 across the communication network 148. In some embodiments, the battery pack information may be sent from the battery pack exchange system 104 across a wireless communication network to the tracking database 152 and/or server. The battery pack information may be used in the method 500 to determine a processing of the used battery pack 108A, the depleted battery pack subassembly 116A, the used desiccant cartridge 112A, and/or other portions thereof. In some embodiments, the battery pack information may be used by an owner or administrator of the tracking database 152 to track battery packs 108 in service. For example, a vehicle manufacturer may lease the battery packs 108 to owners/operators of the electric vehicle 102 and may require routine maintenance of the battery pack 108 installed in the electric vehicle 102. As the battery packs 108 are processed in the battery pack exchange and tracking system 100, the vehicle manufacturer may confirm appropriate maintenance, remove battery packs 108 from operation that do not meet the vehicle manufacturer's standards, and ensure the battery packs 108 in use by electric vehicles 102 are operating within acceptable standards. The method 600 may end or repeat at step 608 by detecting another used battery pack 108A in proximity to the reader 124.

While the flowcharts have been discussed and illustrated in relation to a particular sequence of events, it should be appreciated that changes, additions, and omissions to this sequence can occur without materially affecting the operation of the disclosed embodiments, configuration, and aspects.

With reference now to FIGS. 7 and 8, additional details of data structures 700, 800 that are useable in connection with the battery pack exchange and tracking system 100 will be described in accordance with at least some embodiments of the present disclosure. It should be appreciated that the data structures 700, 800 depicted and described herein may be stored within a central database (e.g., tracking database 152, etc.) or may be distributed among a number of data storage nodes. Additionally or alternatively, some or all of the fields of the data structures 700, 800 may be maintained in devices of the battery pack exchange and tracking system 100 such as the battery pack 108, the battery pack information tag 122, the desiccant cartridge information tag 162, etc., without departing from the scope of the present disclosure.

Referring to FIG. 7, details of a battery pack information data structure 700 that may be stored in the battery pack information tag 122 will be described in accordance with at least some embodiments of the present disclosure. In some embodiments, the tracking database 152 may be configured to store one or multiple battery pack information data structures 700 that are used in tracking a particular battery pack 108 over time. As a non-limiting example, the battery pack information data structure 700 may be used to store a unique ID and service history of a particular battery pack 108. Even more specifically, the battery pack information data structure 700 may include a plurality of data fields that include, for instance, a battery back ID field 704, a vehicle history field 708, a desiccant history field 712, a charging history field 716, a station history field 720, a state of health field 724, a battery test information field 728, and/or other fields 732.

The battery back ID field 704 may be used to store any type of information that identifies a battery pack 108. In one embodiment, the battery back ID field 704 may comprise information that allows one battery pack 108 to be uniquely identified from other battery packs 108 in use, or in the battery pack exchange system 104. The battery back ID field 704 may comprise an ID number, an alphanumeric string, and/or some other unique combination of data that identifies the battery pack 108.

The vehicle history field 708 may be used to store a historical association of the battery pack 108 with one or more electric vehicles 102. For instance, the vehicle history field 708 may comprise information that identifies a particular electric vehicle 102 in which the battery pack 108 identified in the battery back ID field 704 was installed and/or from which the battery pack 108 was removed. In some embodiments, the information in the vehicle history field 708 may be used to track electric vehicles 102 that have used the battery pack 108 identified. This information may be beneficial to track errors, issues, and/or failures associated with an installation, a particular electric vehicle 102, and/or a particular battery pack 108. For instance, if a number of battery packs 108 fail after being installed in a particular electric vehicle 102, the vehicle manufacturer may determine that the particular electric vehicle 102 is the cause of the issues with the battery packs 108. In this case, the vehicle manufacturer may send a message to the owner of the particular electric vehicle 102 to perform a service on the particular electric vehicle 102. In some cases, the vehicle manufacturer, in response to determining the issue (e.g., repeated failures associated with the particular electric vehicle 102, etc.), may send a signal to the battery pack exchange system 104 to prevent an installation of a renewed battery pack 108B in the particular electric vehicle 102 when the particular electric vehicle 102 is at the exchange station 120. In some embodiments, this information may be written to the battery pack information tag 122 of the battery pack 108 and/or stored in the tracking database 152 and associated with the battery pack ID.

The desiccant history field 712 may be used to store information of one or more desiccant cartridges 112 that have been installed in the identified battery pack 108. In some embodiments, different desiccant cartridges 112 may be installed with the battery pack 108 after being renewed. In these cases, the ID information associated with a particular desiccant cartridge 112 may be recorded and stored in the desiccant history field 712. In some embodiments, this information may be written to the battery pack information tag 122 of the battery pack 108 and/or stored in the tracking database 152 and associated with the battery pack ID.

The charging history field 716 may be used to store information regarding a number of charges, or charging cycles, the identified battery pack 108 has gone through over time. For instance, each time a battery pack 108 is serviced at a battery pack exchange system 104, a value in the charging history field 716 may be incremented indicating another charge of the battery pack 108 has been made (e.g., via the battery charging station 136). In some embodiments, this information may be written to the battery pack information tag 122 of the battery pack 108 and/or stored in the tracking database 152 and associated with the battery pack ID. The number of charging cycles a battery pack 108 has been through over time may indicate a possible life of the identified battery pack 108, a performance of the identified battery pack 108, etc. In some embodiments, the information in the charging history field 716 may be used by the battery pack exchange system 104 in determining whether the battery pack 108, or any portion thereof, is allowed to continue in the exchange system 104 (e.g., by being renewed, etc.) or whether the battery pack 108 should be removed from service (e.g., by being directed to the removal area 156).

The station history field 720 may be used to store information about which battery pack exchange system 104 serviced the identified battery pack 108. This information may include an ID of the battery pack exchange system 104 (e.g., a name, location, code, etc.) that identifies one battery pack exchange system 104 from others. In some embodiments, this information may be written to the battery pack information tag 122 of the battery pack 108 and/or stored in the tracking database 152 and associated with the battery pack ID.

The state of health field 724 may be used to store information about a state of health for the identified battery pack 108. The state of health may indicate a condition of the battery pack 108 compared to a set of predetermined criteria. For instance, the state of health may be used to indicate an expected performance of the battery pack 108 (e.g., and an ability to provide energy to an electric vehicle 102). The state of health information may be based on charge transfer rates, maximum charge percentage, voltage measurements, discharge times, internal resistance, etc. In one embodiment, this information may be written and determined after performing a test of the battery pack 108. In some embodiments, this information may be written to the battery pack information tag 122 of the battery pack 108 and/or stored in the tracking database 152 and associated with the battery pack ID.

The battery test information field 728 may be used to store information comprising results of a battery test of the identified battery pack 108. The information in the battery test information field 728 may include a time of the test, ambient conditions during the test (e.g., temperature, humidity, etc.), and a place of the test. The battery test may test the ability of the identified battery pack 108 to accumulate charge, the ability of the identified battery pack 108 to maintain a voltage for a particular amount of time under load, measure conductance and/or resistance of the identified battery pack 108, measure a current drain of the identified battery pack 108, and/or the like. This information may be used to determine the state of health of the identified battery pack 108. In some embodiments, this information may be written to the battery pack information tag 122 of the battery pack 108 and/or stored in the tracking database 152 and associated with the battery pack ID.

FIG. 8 shows details of another data structure 800 that may be used within the battery pack exchange and tracking system 100 in accordance with at least some embodiments of the present disclosure. In particular, a desiccant cartridge data structure 800 is described comprising information associated with tracking a particular desiccant cartridge 112 in the battery pack exchange and tracking system 100 over time. The desiccant cartridge data structure 800 may be used to store a unique ID and service history of a particular desiccant cartridge 112. Even more specifically, the desiccant cartridge data structure 800 may include a plurality of data fields that include, for instance, a desiccant cartridge ID field 804, a battery pack history field 808, a renewal history field 812, and/or other fields 816.

The desiccant cartridge ID field 804 may be used to store any type of information that identifies a desiccant cartridge 112. The desiccant cartridge ID field 804 may comprise information that allows one desiccant cartridge 112 to be uniquely identified from other desiccant cartridge 112 in use, or in the battery pack exchange system 104. The desiccant cartridge ID field 804 may comprise an ID number, an alphanumeric string, and/or some other unique combination of data that identifies the desiccant cartridge 112. In some embodiments, the information in the desiccant cartridge ID field 804 may include an identification of a type of desiccant material 110 associated with the desiccant cartridge 112.

The battery pack history field 808 may be used to store a historical association of the desiccant cartridge 112 with one or more battery packs 108. For example, the battery pack history field 808 may comprise information that identifies a particular battery pack 108 in which the desiccant cartridge 112 identified in the desiccant cartridge ID field 804 was installed and/or from which the desiccant cartridge 112 was removed. In some embodiments, the information in the battery pack history field 808 may be used to track battery packs 108, and/or portions thereof (e.g., battery pack subassemblies 116), that have used the desiccant cartridge 112 identified. This information may be beneficial to track errors, issues, and/or failures associated with an installation, a particular battery pack 108, and/or a particular electric vehicle 102. For instance, if a number of desiccant cartridges 112 are determined to have issues (e.g., overly high moisture content measurements, etc.) after being installed in a particular battery pack 108, the vehicle manufacturer may determine that the particular battery pack 108 is the cause of the issues with the desiccant cartridges 112. In this case, the vehicle manufacturer may send a message (e.g., across the communication network 148) to the battery pack exchange system 104 to remove the particular battery pack 108 from the exchange system 104. In some embodiments, this information may be written to the desiccant cartridge information tag 162 of the desiccant cartridge 112, the battery pack information tag 122 of the battery pack 108, and/or stored in the tracking database 152 and associated with the desiccant cartridge ID and/or the battery pack ID.

The renewal history field 812 may be used to store information regarding a number of times the desiccant cartridge 112 has been dried, or renewed. In some embodiments, each time the desiccant cartridge 112 is dried by the desiccant drying station 132 of a battery pack exchange system 104, a value in the renewal history field 812 may be incremented indicating another renewal of the desiccant cartridge 112 has been performed. In some embodiments, this information may be written to the desiccant cartridge information tag 162 of the desiccant cartridge 112, the battery pack information tag 122 of the battery pack 108 and/or stored in the tracking database 152 and associated with the desiccant cartridge ID and/or the battery pack ID. In one embodiment, the number of times the desiccant cartridge 112 has been renewed over time may indicate a possible lifetime and/or performance of the desiccant material 110 associated with the desiccant cartridge 112. The information in the renewal history field 812 may be used by the battery pack exchange system 104 in determining whether the desiccant cartridge 112 is allowed to continue in the exchange system 104 (e.g., by being renewed, etc.) or whether the desiccant cartridge 112 should be removed from service (e.g., by being directed to the removal area 156). In some embodiments, at the removal area 156, the desiccant material 110 may be replaced in the desiccant cartridge 112. In this case, the desiccant cartridge 112 with new desiccant material 110 may be directed to the desiccant attach station 140 for attachment to a charged battery pack subassembly 116B.

In some embodiments, the information of the battery pack information data structure 700 and/or the desiccant cartridge data structure 800 may be stored in the battery pack information tag 122, the desiccant cartridge information tag 162, in the tracking database 152, and/or in another memory (e.g., storage devices 220, etc.) of the battery pack exchange system 104.

A number of variations and modifications of the disclosure can be used. It would be possible to provide for some features of the disclosure without providing others.

In some embodiments, one or more aspects of the present disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing one or more aspects of the present disclosure illustrated herein can be used to implement the one or more aspects of this disclosure.

Examples provided herein are intended to be illustrative and non-limiting. Thus, any example or set of examples provided to illustrate one or more aspects of the present disclosure should not be considered to comprise the entire set of possible embodiments of the aspect in question. Examples may be identified by the use of such language as "for example," "such as," "by way of example," "e.g.," and other language commonly understood to indicate that what follows is an example.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments of the present disclosure include a method, comprising: receiving an electric vehicle at a battery pack exchange station; removing a used battery pack from the electric vehicle; installing a charged battery pack in the electric vehicle; indexing the used battery pack to a desiccant detach station; detaching, at the desiccant detach station, a desiccant cartridge from the used battery pack; drying, by a heater, a desiccant material of the desiccant cartridge, wherein drying the desiccant material renews the desiccant cartridge for integration with a battery pack; attaching the renewed desiccant cartridge to the battery pack such that the desiccant material is disposed inside the battery pack; and preparing the battery pack comprising the renewed desiccant cartridge for installation into a different electric vehicle.

Aspects of the above method further comprise receiving the different electric vehicle at the battery pack exchange station after the electric vehicle leaves the battery pack exchange station; removing a different used battery pack from the different electric vehicle; and installing the battery pack comprising the renewed desiccant cartridge in the different electric vehicle. Aspects of the above method include wherein while the desiccant material is drying, the method further comprises: indexing, by a conveyor, the used battery pack to a charging station; and charging, by a battery charger of the charging station, the used battery pack to a predetermined charge level, wherein charging the used battery pack renews the used battery pack. Aspects of the above method include wherein the battery pack comprises a housing enclosing a plurality of battery modules therein, wherein each battery module of the plurality of battery modules comprises a plurality of battery cells, wherein the housing comprises an opening disposed in a sidewall, and wherein attaching the renewed desiccant cartridge to the battery pack comprises inserting a portion of the renewed desiccant cartridge through the opening, disposing the desiccant material of the renewed desiccant cartridge inside the housing adjacent to the plurality of battery modules, and locking a portion of the renewed desiccant cartridge to the housing. Aspects of the above method include wherein the used battery pack is the battery pack and wherein the renewed desiccant cartridge is attached to the battery pack prior to charging the used battery pack to the predetermined charge level. Aspects of the above method include wherein prior to detaching the desiccant cartridge from the used battery pack, the method further comprises: scanning, by a reader, an information tag of the used battery pack; and receiving, from the information tag, battery information comprising an identification of the used battery pack and a service history for the used battery pack. Aspects of the above method further comprise sending, via a communications interface across a communication network, the battery information to a battery pack tracking database. Aspects of the above method further comprise determining, based on the battery information received, that the battery pack is allowed to be charged at the charging station. Aspects of the above method include wherein preparing the battery pack for installation into the different electric vehicle comprises queuing the battery pack in a first in first out accumulation storage area. Aspects of the above method include wherein removing the used battery pack from the electric vehicle comprises: actuating, automatically via a controller, a mechanical lift comprising a tray attached thereto into proximity with an underside of the electric vehicle; unscrewing, automatically via the controller, the used battery pack from a fastened state with the electric vehicle to an unfastened state from the electric vehicle, wherein the used battery pack is supported by the tray in the unfastened state; retracting, automatically via the controller, the mechanical lift such that the used battery pack is transferred to a conveyer running between the exchange station and the desiccant detach station.

Embodiments of the present disclosure include a battery pack exchange system, comprising: a battery pack exchange station comprising a vehicle receiving area and a mechanical lift that removes a used battery pack from an electric vehicle parked in the vehicle receiving area and installs a charged battery pack in the electric vehicle; a desiccant detach station that receives the used battery pack from the battery pack exchange station and separates a desiccant cartridge from the used battery pack; a desiccant drying station that receives the desiccant cartridge from the desiccant detach station, the desiccant drying station comprising a heater that dries a desiccant material of the desiccant cartridge and renews the desiccant cartridge for integration with a battery pack; a desiccant attach station that receives the battery pack and the renewed desiccant cartridge and attaches the renewed desiccant cartridge to the battery pack such that the desiccant material is disposed inside the battery pack; and an accumulation storage area that receives the battery pack and stores the battery pack in a first in first out arrangement for the battery pack exchange station to install the battery pack into a different electric vehicle.

Aspects of the above system further comprise a battery pack charging station comprising a battery charger that receives the used battery pack and charges the used battery pack to a predetermined charge level, wherein charging the used battery pack renews the used battery pack. Aspects of the above system further comprise a reader disposed after the battery pack exchange station, wherein the reader scans an information tag of the used battery pack and, in response, receives battery information comprising an identification of the used battery pack and a service history for the used battery pack. Aspects of the above system further comprise a communications interface coupled with the reader, wherein the battery information is transmitted via the communications interface across a communication network to a battery pack tracking database. Aspects of the above system further comprise a first conveyor that transfers the used battery pack from the battery pack exchange station to the desiccant detach station; a second conveyor that transfers the desiccant cartridge from the desiccant detach station to the desiccant drying station; and a third conveyor that transfers the used battery pack from the desiccant detach station to the battery pack charging station. Aspects of the above system include wherein the desiccant drying station further comprises: a heated chamber that provides a temperature-controlled environment for the desiccant cartridge while the desiccant material is being dried by the heater; and a temperature sensor that measures a temperature inside the heated chamber, the temperature sensor coupled with a processor that controls an output of heat from the heater based on the measured temperature. Aspects of the above system include wherein the second conveyor runs through the heated chamber, and wherein the second conveyor moves the desiccant cartridge inside the heated chamber in a serpentine path from an entrance of the heated chamber to an exit of the heated chamber.

Embodiments of the present disclosure include a method, comprising: receiving a battery pack comprising a housing and an inner compartment that encloses a plurality of battery modules therein, wherein a desiccant cartridge is disposed at least partially inside the inner compartment; separating the desiccant cartridge from the battery pack; transferring, automatically by a first conveyor, the desiccant cartridge into a temperature-controlled heated environment; drying, by a heater, a desiccant material of the desiccant cartridge while the desiccant cartridge is maintained in the temperature-controlled heated environment; attaching the dried desiccant cartridge to the housing of the battery pack such that the desiccant material is disposed inside the inner compartment; transferring, automatically by a second conveyor, the battery pack and attached dried desiccant cartridge into a charging station comprising a battery charger; and charging, by the battery charger, the battery pack to a predetermined charge level.

Aspects of the above method include wherein prior to receiving the battery pack the method further comprises: receiving an electric vehicle comprising the battery pack at a battery pack exchange station; removing, automatically via a robotic machine, the battery pack from the electric vehicle; and installing, automatically via the robotic machine, a previously-charged battery pack including a previously-dried desiccant cartridge attached thereto in the electric vehicle. Aspects of the above method include wherein after removing the battery pack from the electric vehicle, the method further comprises: scanning, by a reader, a radio frequency (RF) tag attached to the housing of the battery pack; receiving, from the RF tag, battery information comprising at least two of an identification of the battery pack, a vehicle history for the battery pack, a desiccant history for the battery pack, a charging history for the battery pack, and a state of health of the battery pack; and sending, via a communications interface across a wireless communication network, the battery information to a battery pack tracking database.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include, but are in no way limited to, chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with onboard rechargeable energy storage, including electric vehicles and hybrid electric vehicles.

Examples of processors as referenced herein may include, but are not limited to, any of the processors described herein and such processors may perform computational functions using any known or future-developed standard, instruction set, libraries, and/or architecture.

What is claimed is:

1. A method, comprising:
receiving an electric vehicle at a battery pack exchange station;
removing a used battery pack from the electric vehicle;
installing a charged battery pack in the electric vehicle;
indexing the used battery pack to a desiccant detach station;
detaching, at the desiccant detach station, a desiccant cartridge from the used battery pack;
drying, by a heater, a desiccant material of the desiccant cartridge, wherein drying the desiccant material renews the desiccant cartridge for integration with a battery pack;
attaching the renewed desiccant cartridge to the battery pack such that the desiccant material is disposed inside the battery pack; and
preparing the battery pack comprising the renewed desiccant cartridge for installation into a different electric vehicle.

2. The method of claim 1, further comprising:
receiving the different electric vehicle at the battery pack exchange station after the electric vehicle leaves the battery pack exchange station;
removing a different used battery pack from the different electric vehicle; and
installing the battery pack comprising the renewed desiccant cartridge in the different electric vehicle.

3. The method of claim 2, wherein while the desiccant material is drying, the method further comprises:
indexing, by a conveyor, the used battery pack to a charging station; and
charging, by a battery charger of the charging station, the used battery pack to a predetermined charge level, wherein charging the used battery pack renews the used battery pack.

4. The method of claim 3, wherein the battery pack comprises a housing enclosing a plurality of battery modules therein, wherein each battery module of the plurality of battery modules comprises a plurality of battery cells, wherein the housing comprises an opening disposed in a sidewall, and wherein attaching the renewed desiccant cartridge to the battery pack comprises inserting a portion of the renewed desiccant cartridge through the opening, disposing the desiccant material of the renewed desiccant cartridge inside the housing adjacent to the plurality of battery modules, and locking a portion of the renewed desiccant cartridge to the housing.

5. The method of claim 4, wherein the used battery pack is the battery pack and wherein the renewed desiccant cartridge is attached to the battery pack prior to charging the used battery pack to the predetermined charge level.

6. The method of claim 4, wherein prior to detaching the desiccant cartridge from the used battery pack, the method further comprises:

scanning, by a reader, an information tag of the used battery pack; and
receiving, from the information tag, battery information comprising an identification of the used battery pack and a service history for the used battery pack.

7. The method of claim 6, further comprising:
sending, via a communications interface across a communication network, the battery information to a battery pack tracking database.

8. The method of claim 6, further comprising:
determining, based on the battery information received, that the battery pack is allowed to be charged at the charging station.

9. The method of claim 6, wherein preparing the battery pack for installation into the different electric vehicle comprises queuing the battery pack in a first in first out accumulation storage area.

10. The method of claim 6, wherein removing the used battery pack from the electric vehicle comprises:
actuating, automatically via a controller, a mechanical lift comprising a tray attached thereto into proximity with an underside of the electric vehicle;
unscrewing, automatically via the controller, the used battery pack from a fastened state with the electric vehicle to an unfastened state from the electric vehicle, wherein the used battery pack is supported by the tray in the unfastened state;
retracting, automatically via the controller, the mechanical lift such that the used battery pack is transferred to a conveyer running between the battery pack exchange station and the desiccant detach station.

11. A battery pack exchange system, comprising:
a battery pack exchange station comprising a vehicle receiving area and a mechanical lift that removes a used battery pack from an electric vehicle parked in the vehicle receiving area and installs a charged battery pack in the electric vehicle;
a desiccant detach station that receives the used battery pack from the battery pack exchange station and separates a desiccant cartridge from the used battery pack;
a desiccant drying station that receives the desiccant cartridge from the desiccant detach station, the desiccant drying station comprising a heater that dries a desiccant material of the desiccant cartridge and renews the desiccant cartridge for integration with a battery pack;
a desiccant attach station that receives the battery pack and the renewed desiccant cartridge and attaches the renewed desiccant cartridge to the battery pack such that the desiccant material is disposed inside the battery pack; and
an accumulation storage area that receives the battery pack and stores the battery pack in a first in first out arrangement for the battery pack exchange station to install the battery pack into a different electric vehicle.

12. The battery pack exchange system of claim 11, further comprising:
a battery pack charging station comprising a battery charger that receives the used battery pack and charges the used battery pack to a predetermined charge level, wherein charging the used battery pack renews the used battery pack.

13. The battery pack exchange system of claim 12, further comprising:
a reader disposed after the battery pack exchange station, wherein the reader scans an information tag of the used battery pack and, in response, receives battery information comprising an identification of the used battery pack and a service history for the used battery pack.

14. The battery pack exchange system of claim 13, further comprising:
a communications interface coupled with the reader, wherein the battery information is transmitted via the communications interface across a communication network to a battery pack tracking database.

15. The battery pack exchange system of claim 13, further comprising:
a first conveyor that transfers the used battery pack from the battery pack exchange station to the desiccant detach station;
a second conveyor that transfers the desiccant cartridge from the desiccant detach station to the desiccant drying station; and
a third conveyor that transfers the used battery pack from the desiccant detach station to the battery pack charging station.

16. The battery pack exchange system of claim 15, wherein the desiccant drying station further comprises:
a heated chamber that provides a temperature-controlled environment for the desiccant cartridge while the desiccant material is being dried by the heater; and
a temperature sensor that measures a temperature inside the heated chamber, the temperature sensor coupled with a processor that controls an output of heat from the heater based on the measured temperature inside the heated chamber.

17. The battery pack exchange system of claim 16, wherein the second conveyor runs through the heated chamber, and wherein the second conveyor moves the desiccant cartridge inside the heated chamber in a serpentine path from an entrance of the heated chamber to an exit of the heated chamber.

18. A method, comprising:
receiving a battery pack comprising a housing and an inner compartment that encloses a plurality of battery modules therein, wherein a desiccant cartridge is disposed at least partially inside the inner compartment;
separating the desiccant cartridge from the battery pack;
transferring, automatically by a first conveyor, the desiccant cartridge into a temperature-controlled heated environment;
drying, by a heater, a desiccant material of the desiccant cartridge while the desiccant cartridge is maintained in the temperature-controlled heated environment;
attaching the dried desiccant cartridge to the housing of the battery pack such that the desiccant material is disposed inside the inner compartment;
transferring, automatically by a second conveyor, the battery pack and attached dried desiccant cartridge into a charging station comprising a battery charger; and
charging, by the battery charger, the battery pack to a predetermined charge level.

19. The method of claim 18, wherein prior to receiving the battery pack the method further comprises:
receiving an electric vehicle comprising the battery pack at a battery pack exchange station;
removing, automatically via a robotic machine, the battery pack from the electric vehicle; and
installing, automatically via the robotic machine, a previously-charged battery pack including a previously-dried desiccant cartridge attached thereto in the electric vehicle.

20. The method of claim 19, wherein after removing the battery pack from the electric vehicle, the method further comprises:
scanning, by a reader, a radio frequency (RF) tag attached to the housing of the battery pack;
receiving, from the RF tag, battery information comprising at least two of an identification of the battery pack, a vehicle history for the battery pack, a desiccant history for the battery pack, a charging history for the battery pack, and a state of health of the battery pack; and
sending, via a communications interface across a wireless communication network, the battery information to a battery pack tracking database.

* * * * *